J. BOWEN.
FRICTION CLUTCH.
APPLICATION FILED MAR. 15, 1912.
1,040,866.
Patented Oct. 8, 1912.
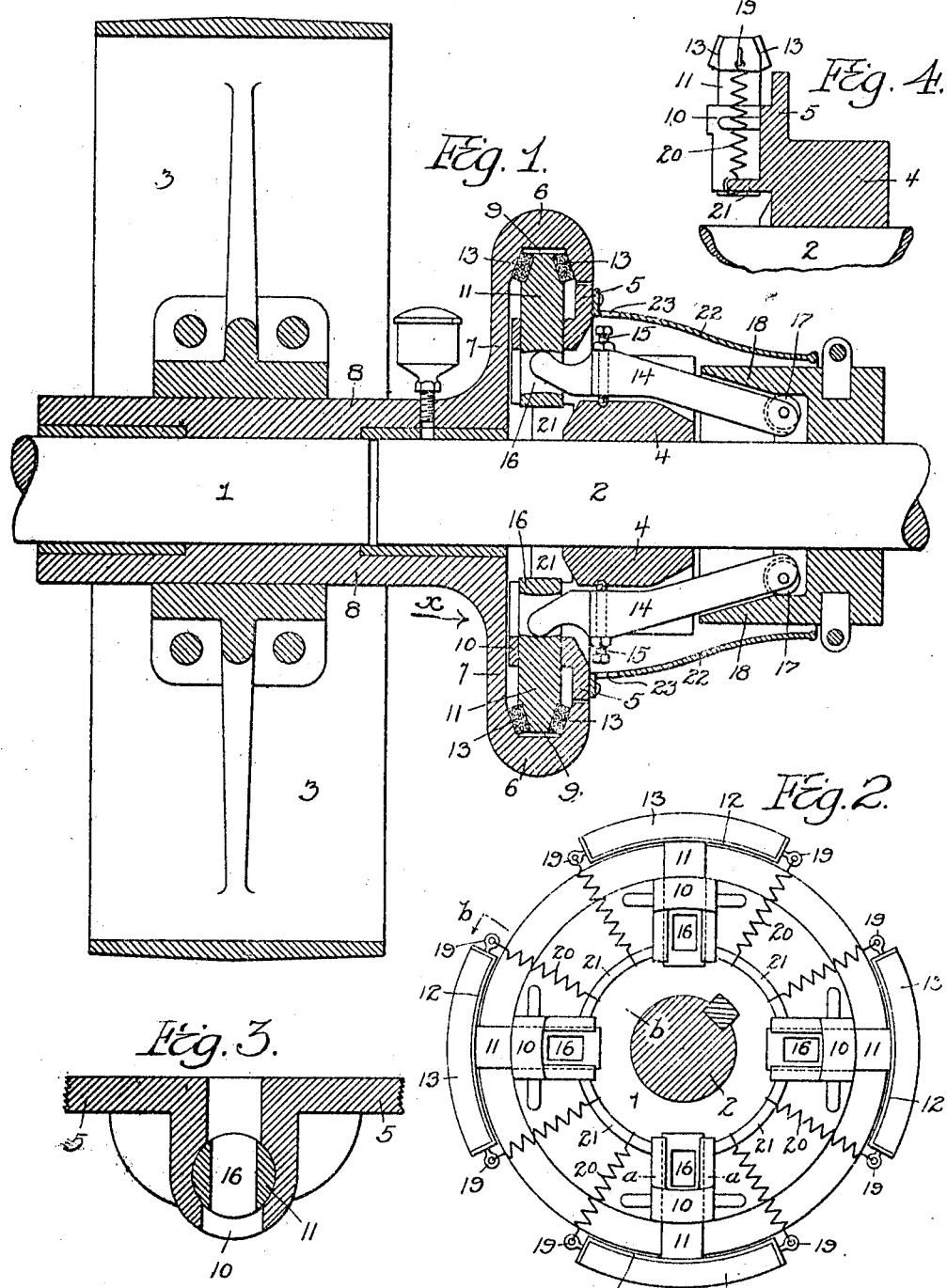
WITNESSES
E. Fullerton
Hamilton D. Turner
INVENTOR
JAMES BOWEN
BY HIS ATTORNEY
Harry Smith

UNITED STATES PATENT OFFICE.

JAMES BOWEN, OF MANHEIM, PENNSYLVANIA, ASSIGNOR TO BOND FOUNDRY & MACHINE COMPANY, OF MANHEIM, PENNSYLVANIA, A CORPORATION OF PENNSYLVANIA.

FRICTION-CLUTCH.

1,040,866.   Specification of Letters Patent.   Patented Oct. 8, 1912.

Application filed March 15, 1912. Serial No. 684,045.

*To all whom it may concern:*

Be it known that I, JAMES BOWEN, a citizen of the United States, residing in Manheim, Lancaster county, Pennsylvania, have invented certain Improvements in Friction-Clutches, of which the following is a specification.

My invention relates to that type of friction clutch or coupling (hereinafter termed a coupling) in which one member has a flange to be engaged by shoes carried by segments on radially movable stems guided in the other member and actuated by presser levers on said member, the objects of my invention being to prevent injury to any part of the person by accidental contact of the same with a moving part of the coupling; to simplify and cheapen the construction of a coupling of this type, and to insure the firm grip of one member upon the other when the same are connected, and the ready release of one member from the other when the same are being disconnected.

In the accompanying drawing Figure 1 is a longitudinal vertical section of a friction coupling constructed in accordance with my invention; Fig. 2 is a face view of one member of the same looking in the direction of the arrow *x*, Fig. 1; Fig. 3 is a transverse section on the line *a—a*, Fig. 2, but on an enlarged scale, and Fig. 4 is a transverse section on the line *b—b*, Fig. 2.

In the drawing, 1 and 2 represent the adjoining ends of two shafts which are to be coupled together, 1 being the driving shaft to which power is applied in any suitable way, as for instance, by means of a belt on a pulley 3 which is secured to said shaft 1, and 2 being the shaft to which power is to be transmitted, although as will be evident the reverse of this arrangement may be true without in any way affecting the character of my invention, or the shaft 2 may simply be clutched to or released from the pulley 3, which may be either the driving or the driven member, the shaft 1 either rotating or being stationary, or being omitted altogether if the shaft 2 is extended so as to carry the pulley 3.

Keyed upon the shaft 2 is the hub 4 of a disk 5, the latter being overlapped by a flange 6 which projects from a disk 7 secured to or forming part of a hub 8 of the wheel 3 or being otherwise connected to the shaft 1, said flange 6 having an internal groove 9 with flaring sides, as shown in Fig. 1.

Projecting from that face of the disk 5 which is toward the disk 7 are a series of bosses 10, four of which are shown in the present instance, each of these bosses having therein a cylindrical bore for the reception of the similarly shaped stem 11 of a segment 12, whose opposite faces are flared on an angle corresponding to the angle of flare of the opposite sides of the groove 9 in the flange 6, each of the flaring faces of the segment carrying a shoe 13 of leather, felt, cork, or other desirable friction material.

The disk 5, each of its bosses 10 and its hub 4 are slotted for the reception of levers 14 which are provided with fulcrum bolts 15, whose inner ends rest in sockets in the bases of the slots in the hub 4, as shown in Fig. 1, the inner end of the short arm of each lever 14 entering a slot 16 in its respective stem 11 and bearing against the upper wall of said slot, as shown in Fig. 1. The long arm of each of the levers 14 carries an anti-friction roller 17 which is acted upon by a cone 18 free to slide longitudinally on the shaft 2, or the levers are otherwise connected to a longitudinally movable actuating device on the shaft.

At each end of each of the segments 12 is a projecting eye 19 to which is connected the outer end of a coiled spring 20 whose inner end engages a rib 21 projecting from the inner face of the disk 5 and serving to connect and brace the slotted inner portions of the bosses 10, as shown in Fig. 2. When, therefore, the cone 18 is moved to the position shown in Fig. 1, the long arms of the levers 14 will be depressed and their short arms will be moved in the opposite direction so as to force radially outward the stems 11 of the segments 12, thereby driving the latter into the groove 9 in the flange 6 and causing the outwardly flaring faces of the friction shoes 13 to be forced firmly into contact with the similarly flaring sides of the groove, as shown in Fig. 1, the resulting wedge-like action insuring the firm grip of the shoes upon the walls of the flange and a strong frictional driving connection between the shafts 1 and 2, or between the shaft 2 and pulley 3.

The outward movement of the segments 12 causes the distention of the springs 20 and when the cone 18 is moved upon the shaft 2 so as to free from its influence the rollers 17 on the levers 14, the recoil of the springs 20 will cause the segments 12 and their stems 11 to be drawn inwardly so as to free the friction shoes 13 from contact with the walls of the groove 9, the long arms of the levers 14 being thrown outwardly so as to be again in position for the action of the cone 18 when the latter is again moved to the position shown in Fig. 1.

The wedge-like form of the groove in the flange 6, besides insuring a firm grip of the friction shoes 13, also facilitates the release of the same when the segments 12 are retracted under the influence of the springs 20. The cylindrical form of the stems 11 simplifies the machine work necessary in the fitting up the parts of the clutch, the bosses 10 simply having to be bored and the stems 11 turned, and the use of the fulcrum bolts 15 facilitates the hanging of the levers 14, since the inner ends of said bolts simply rest in the sockets formed in the outer face of the hub 4 for their reception, consequently the levers can be readily applied or removed and provision is afforded for adjusting the same so as to insure any desired application of force to the stems 11 when the same are being thrust outwardly by the levers. The presence of the stiffening ribs 21 on the face of the disk 5 provides a ready means for attaching the inner ends of the springs 20.

It will be noted that the periphery of the disk 5 approaches closely to the overhanging portion of the flange 6 on the disk 7 and that these two members inclose the segments 12 and stems 11, the bosses 10 which guide the latter, and the springs 20 which retract the segments so that they are protected from injury by contact with any foreign body while they are in rotation, and are also prevented from causing injury to any such foreign body. In order to likewise shield the levers 14 those portions of the latter which would otherwise be exposed are covered by a hood 22 which may be secured to or form part of either the lever-carrying disk 5 or the lever-actuating sleeve 18. In the present instance it is carried by the disk 5 and overlaps the sleeve 18, as shown in Fig. 1, so as not to interfere with the free back and forth movement of the latter. The hood 22 has openings 23 formed therein in order to permit access to the adjusting screws 15 for the levers 14. The rotating parts of the clutch present a smooth external surface without any projecting parts which would be likely to cause injury either to person or property by contact therewith while the clutch was in rapid rotation.

I claim:

1. In a friction coupling, the combination of a disk having bosses thereon, a series of clutch segments each having a stem guided in one of said bosses, a lever carrying member having levers acting upon said stems and each having a fulcrum bolt whose inner end is seated in a socket in the lever-carrying member and is adjustable in respect to the lever.

2. In a friction coupling, the combination of a disk having a series of bosses, and stiffening and strengthening ribs connecting the same, with clutch segments each having a stem guided in one of the bosses, and retracting springs for said clutch segments each engaging at its inner end with a rib on the disk.

3. In a friction coupling, the combination of one member having an overhanging flange and another member carrying a series of clutching elements for frictional engagement with said flange, the latter member having a projecting flange which extends up to the flange on the other member, thereby inclosing the clutching elements and preventing external access thereto.

4. In a friction coupling, the combination of one member having an overhanging flange and another member having clutching elements for frictional engagement with said flange, said clutching elements including actuating levers carried by said latter member, and having adjustable fulcrum bolts and a hood for covering said levers and preventing external access thereto said hood having openings in line with said bolts for permitting access thereto when the clutch is at rest.

In testimony whereof, I have signed my name to this specification, in the presence of two subscribing witnesses.

JAMES BOWEN.

Witnesses:
MORGAN T. WILLIAMS,
WILLIAM W. WILLIAMS.